United States Patent [19]
Hendriks et al.

[11] Patent Number: 5,550,693
[45] Date of Patent: Aug. 27, 1996

[54] AIR BEARING SLIDER HAVING PROJECTIONS THAT PROVIDE MINIMAL ACTUAL CONTACT AREA

[75] Inventors: Ferdinand Hendriks, Yorktown Heights, N.Y.; Michel P. Robert, San Jose, Calif.

[73] Assignee: International Business Machines Corporation, Armonk, N.Y.

[21] Appl. No.: 333,012

[22] Filed: Oct. 31, 1994

[51] Int. Cl.$^6$ ................................................. G11B 5/60
[52] U.S. Cl. ................................................................ 360/103
[58] Field of Search ............................................. 360/103

[56] References Cited

U.S. PATENT DOCUMENTS

| | | | |
|---|---|---|---|
| 4,218,715 | 8/1980 | Garnier | 360/103 |
| 4,251,841 | 1/1981 | Jacobs | 360/122 |
| 4,420,780 | 12/1983 | Deckert | 360/103 |
| 4,636,894 | 1/1987 | Mo | 360/103 |
| 4,802,042 | 1/1989 | Strom | 360/103 |
| 4,894,114 | 1/1991 | Takenchi et al. | 360/103 |
| 5,067,037 | 11/1991 | Ananth et al. | 360/103 |
| 5,079,657 | 1/1992 | Aronoff et al. | 360/97 |
| 5,086,360 | 2/1992 | Smith et al. | 360/103 |
| 5,107,382 | 4/1992 | Matsuzawa et al. | 360/103 |
| 5,134,531 | 7/1992 | Matsuzaki et al. | 360/103 |

FOREIGN PATENT DOCUMENTS

| | | | |
|---|---|---|---|
| 57-82250 | 5/1985 | Japan | 360/103 |
| 4-17176 | 1/1992 | Japan . | |

OTHER PUBLICATIONS

Pending U.S. application Ser. No. 08/082,210 Filed Jun. 24, 1993 "Speed Independent, Air Bearing Slider" RM Crone, VD Khanna & F. Hendriks.

Pending U.S. application Ser. No. 08/082,205 Filed Jun. 24, 1993 "Speed Independent, Air Bearing Slider" M. E. Re and F. Hendriks.

*Primary Examiner*—A. J. Heinz
*Attorney, Agent, or Firm*—Jay P. Sbrollini

[57] ABSTRACT

A slider for providing an air bearing between a transducer and a moving recording surface includes a platform having a first surface with a leading edge opposite a trailing edge and a lateral axis between the leading and trailing edges. A plurality of projections extend from the first surface. At least one of the projections is disposed between the leading edge and the lateral axis and another of the projections is disposed between the trailing edge and the lateral axis. Each of the projections includes a second surface and a recess facing the leading edge. The recesses are bounded on their sides by shrouds that limit air bearing leakage. The recesses provide lift and stability to the slider when the recording surface is moving and always remain out of contact with the recording surface. To limit stiction, only the second surface of the projections is in apparent contact with the recording surface when the recording surface is stationary.

24 Claims, 3 Drawing Sheets

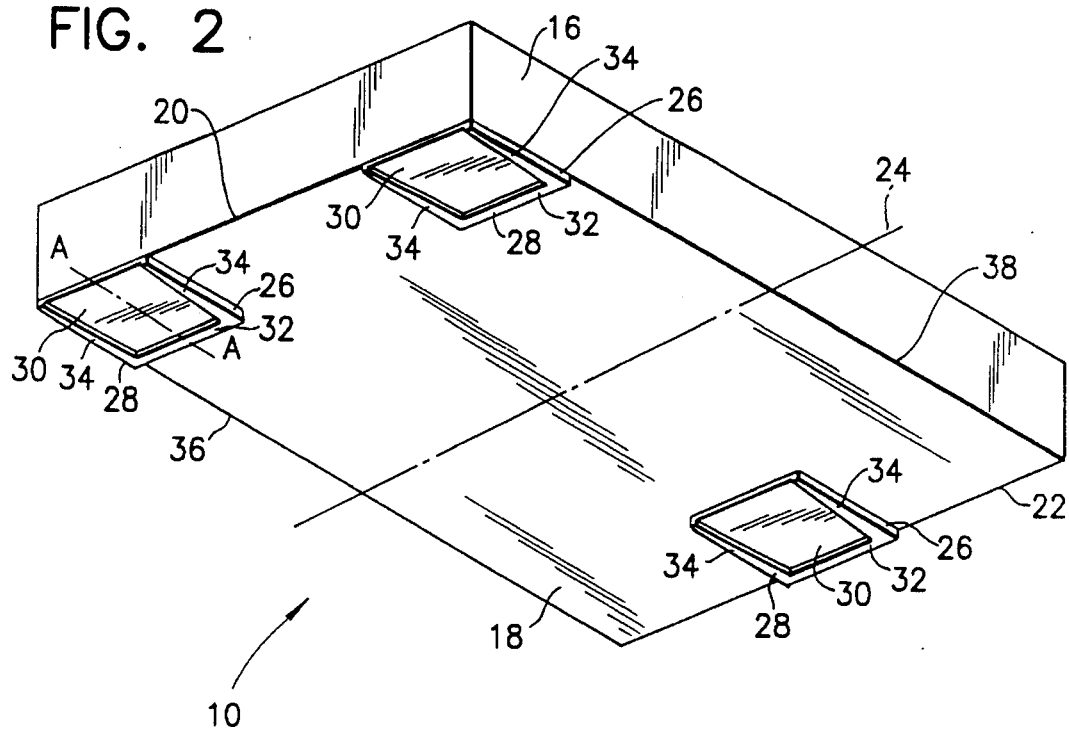
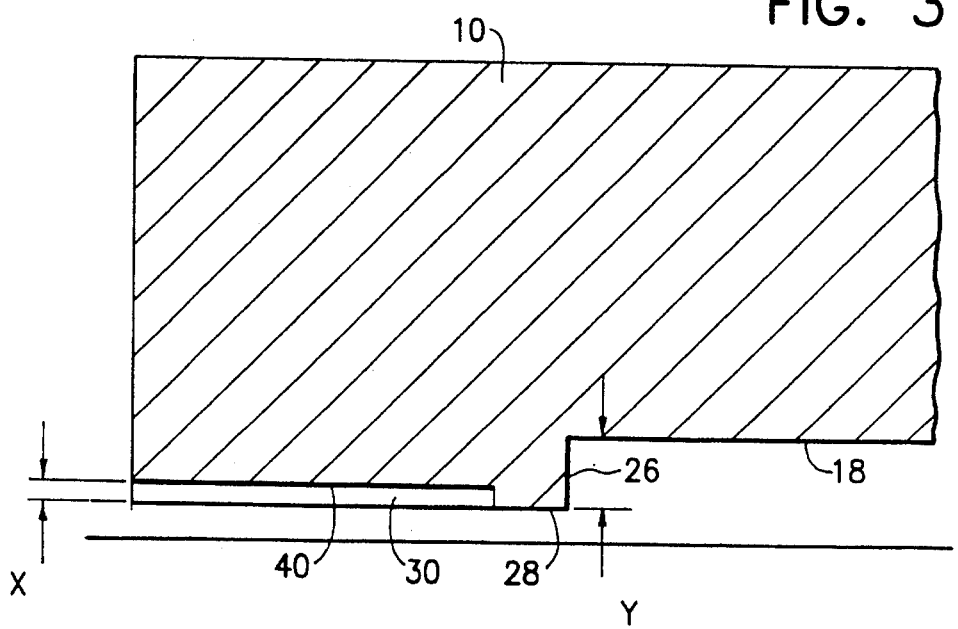

AIR BEARING SLIDER HAVING PROJECTIONS THAT PROVIDE MINIMAL ACTUAL CONTACT AREA

BACKGROUND OF THE INVENTION

1. Technical Field

The invention relates to air bearing sliders, and, more particularly, to low stiction air bearing sliders.

2. Description of the Prior Art

Magnetic storage devices typically include a magnetic storage disk having a plurality of tracks for storing data, and a slider to which is secured a transducer for reading data from and writing data to each of the tracks. For most high capacity magnetic storage applications, when the disk is at rest, the slider contacts the disk. When the disk rotates, the slider provides an air bearing between the rotating disk and the transducer. In order to function properly, the slider must maintain the following: proper fly height and adequate roll, pitch and normal stiffness over the predetermined data band, corresponding to a range of operating speeds, and over the predetermined range of skew angles (i.e. angle between the longitudinal axis of the slider and the tangential disk velocity vector); low takeoff speed; low stiction at start-up; and insensitivity to wear and debris. Proper fly height and adequate air bearing stiffness are provided so that the slider does not contact the disk, thus avoiding disk damage and data read/write errors. Similarly, low takeoff speed and low stiction at start-up limit disk damage during takeoff and landing as well as slider wear.

Moreover, as magnetic storage systems are designed for higher and higher recording densities, the air bearing gap between the transducer and the rotating disk is reduced. A requirement for achieving a small air bearing gap is increased smoothness of the disk. As a rule, this leads to increased stiction. In the most commonly used air bearing designs, namely railed, taper-flat sliders, the slider and the disk have substantial apparent contact area upon standstill, giving rise to increased stiction.

To avoid stiction, an approach commonly known as load/unload has been commercialized. During the load operation, the slider is deftly lowered onto a rotating disk. During the unload operation, the slider is lifted off the disk prior to stopping the disk. Because contact between the slider and the disk is avoided altogether, the effects of stiction are averted. Details of the load/unload operation may be found in R. M. Crone, M. S. Jhon, B. Bhushan, T. Karis, *Numerical Simulation of Dynamic Slider Loading and Transient Slider Response to Surface Defects*, Adv. Info. Storage Syst., Vol. 3, 1991, pp. 15–31, and U.S. Pat. No. 5,189,575. However, this approach is relatively costly and may lead to contamination of the read/write head assembly, which occurs when the arm that carries the read/write head assembly slides in contact with a surface which is tilted relative to the disk and generates microscopic wear particles. Consequently, starting and stopping the slider in contact with the disk is still a widespread approach.

To limit stiction when the slider is started and stopped in contact with the disk, the prior art evidences a number of techniques. For example, commonly assigned U.S. Pat. No. 4,420,780 to Deckert discloses a slider having rails with lengthwise curvature (known in the industry as crowned rails) for limiting stiction. However, it is apparent that the slider can rock on the disk surface giving rise to delayed takeoff and early landing. Moreover, even though the apparent contact area of such a slider is nearly zero, the actual contact area is uncertain due to elastic deformation of the disk asperities and possible wicking of liquid (such as water vapor) into the disk/slider gap.

Furthermore, it is common practice to apply a lubricant on the disk. The lubricant may be a mobile liquid or a liquid chemically bound to the surface of the disk. However, while beneficial from the point of view of disk durability and protection of the disk surface against inadvertent contact, lubricants aggravate the stiction problem (i.e., too little affords too little protection against wear; too much leads to unacceptable stiction). For this reason, the amount of lubricant must be carefully metered in harmony with the disk roughness.

Accordingly, there remains a need in the art for a slider that provides proper fly height, adequate air bearing stiffness and also low stiction such that the slider is suitable for use in high density recording systems having a minimal air bearing gap. In particular, there is a need for a slider design with minimal actual contact area. Although there are slider designs that have zero apparent contact area, such as the cited patent to Deckert, the actual contact area is uncertain due to the causes described above (wicking, etc.).

SUMMARY OF THE INVENTION

The above-stated problems and related problems of the prior art are solved with the principles of the present invention, an air bearing slider with minimal actual contact area. The slider of the present invention comprises a platform having a first surface with a leading edge opposite a trailing edge and a lateral axis between the leading and trailing edges. A plurality of projections extend from the first surface. At least one of the projections is disposed between the leading edge and the lateral axis and another of the projections is disposed between the trailing edge and the lateral axis. Each projection includes a second surface and a recess facing the leading edge. The recesses are needed to provide lift and stability to the slider when the recording surface is moving. To limit stiction, only the second surface of the projections is in apparent contact with the recording surface when the recording surface is stationary.

BRIEF DESCRIPTION OF THE DRAWINGS

FIG. 2 is a bottom isometric view of the slider of FIG. 1.

FIG. 3 is a view of cross section A—A as shown in FIG. 2 illustrating one of the projections.

DESCRIPTION OF THE PREFERRED EMBODIMENTS

Figure 1A:
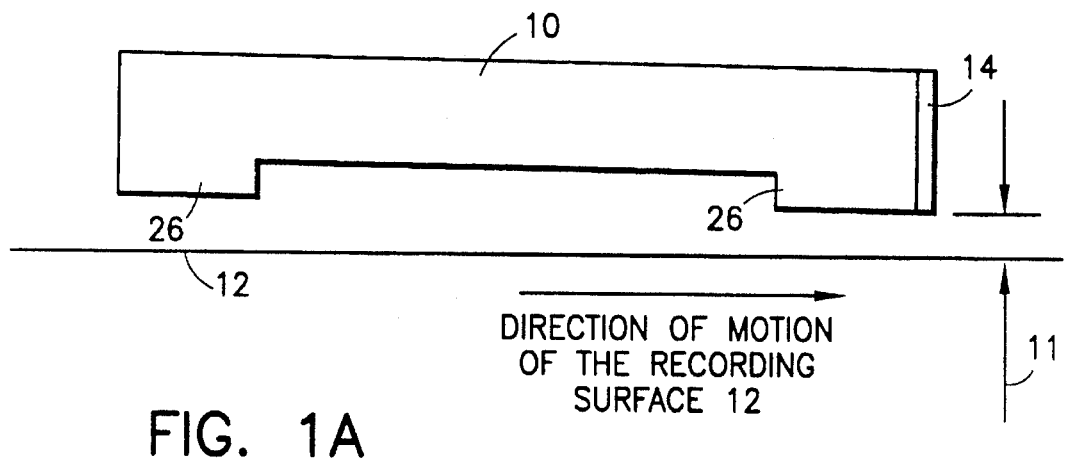
FIG. 1A is a somewhat schematic side elevational view of the slider in accordance with the present invention shown in relation to a moving recording surface.

With reference to the figures, there is shown a slider 10 in accordance with the present invention. As shown in FIG. 1A, the slider 10 provides an air bearing gap 11 between a moving recording surface 12 and a transducer 14 affixed to the slider 10. Typically, the recording surface 12 is a surface of a rotating disk, but the invention is not limited in this respect. Moreover, the transducer 14 and the recording surface 12 may utilize magnetic, optical, or other data storage techniques to store to and read data from the recording surface 12.

As shown in FIG. 2, the slider 10 includes a platform 16 having a bottom surface 18 with a leading edge 20 opposite a trailing edge 22 and a lateral axis 24 between the leading and trailing edges. A plurality of projections 26 extend from the bottom surface 18. Each projection 26 includes a second surface 28 and a recess 30 that defines a pocket region facing the leading edge 20. The recesses 30 provide lift and stability to the slider 10 when the recording surface 12 is moving.

The second surface 28 of the projections 26 are in apparent contact with the recording surface 12 when the recording surface 12 is stationary. More particularly, because of surface irregularities in the second surface 28 and/or the recording surface 12, a subset of the total actual surface area of the second surface 28 typically contacts the recording surface 12. Thus, the second surface 28 is said to be in apparent contact with the recording surface 12.

The number of projections 26, the dimensions of each projection, and the location of the projections can vary according to design such that the requirements for lift, proper fly height, air bearing stiffness and low stiction are satisfied. However, it is preferred that at least one projection is disposed between the leading edge 20 and the lateral axis 24 and another projection is disposed between the trailing edge 22 and the lateral axis 24 such that only the second surface 28 of the projections 26 is in apparent contact with the recording surface 12 when the recording surface is stationary. This arrangement limits stiction by limiting the actual contact surface area between the slider 10 and the recording surface 12.

Figure 1B:
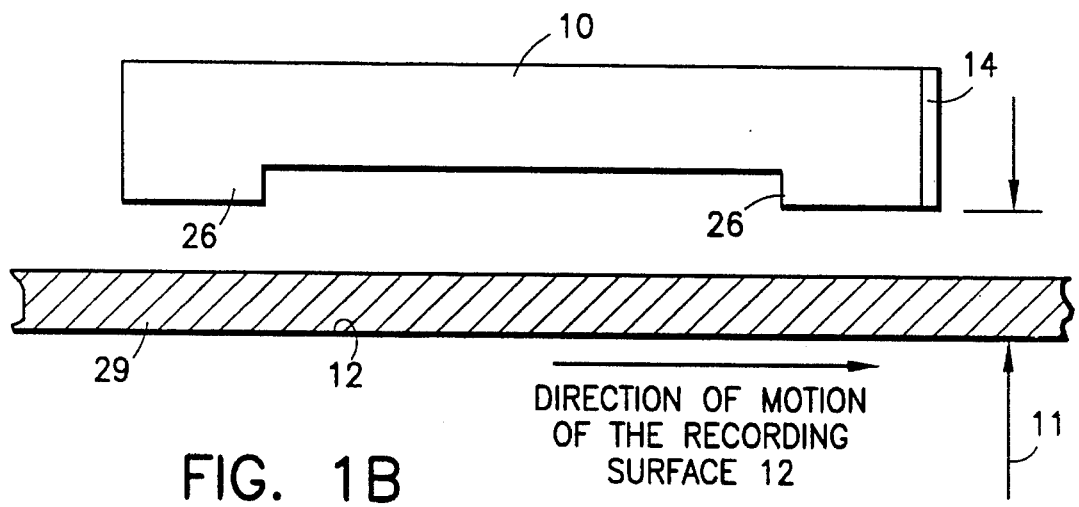
FIG. 1B illustrates the application of a lubricant to the recording surface in accordance with the present invention.

As shown in FIG. 1B, a lubricant 29 may be applied to the recording surface 12. In this case, the second surface 28 of the projections 26 contacts the lubricant 29 when the recording surface 12 is stationary. This arrangement limits stiction by limiting the actual contact surface area between the slider 10 and the lubricant 29.

Furthermore, the exact shape of each recess 30 can be varied according to design. In general, the recesses 30 are formed in the shape of a shrouded step bearing. A step (or stepped) bearing is a bearing with a surface that has one or more discontinuities (steps). For example, the simplest step bearing has one surface with a distance (gap) h1 to the recording surface followed (in the direction of the motion of the recording surface) by a surface with a distance (gap) h2 to the recording surface. To create lift h2 must be smaller than h1. The step bearing is utilized because it provides a steep (yet delayed) takeoff, adequate air bearing stiffness and stability, a fly height with reduced dependence on the speed of the recording surface and, most importantly, low stiction.

In the preferred embodiment as shown in FIG. 2, each recess 30 has a back wall 32 substantially parallel to the leading edge 20 and a pair of side shrouds 34 that are substantially perpendicular to the back wall 32 and narrow as they extend from the back wall 32 toward the leading edge 20. These air bearing shapes provide the highest air compression possible (about three times that of those shapes common in the industry); and, therefore, the contact surface area of the projections 26 can be correspondingly reduced for the same slider pre-load.

Moreover, in the preferred embodiment as shown in FIG. 2, the slider 10 includes three projections 26. A first projection is disposed adjacent a left side 36 and the leading edge 20. A second projection is disposed adjacent to a right side 38 and the leading edge 20. A third projection is disposed between the left and right sides and adjacent to the trailing edge 22. Placing the projections 26 near the perimeter of the slider 10 achieves maximum pitch and roll stiffness. The three projections 26 need not have the same size.

FIG. 3 is a cross sectional view of one of the projections 26. As shown, the recess 30 of the projection 26 is defined by a third surface 40. The distance between the third surface 40 and the second surface 28 is labeled X. The distance X, which is also termed the pocket or recess depth, plays an important role in determining the air bearing gap 11 as shown in FIG. 1. In particular, the lift created by the step bearing increases until a certain maximum lift is reached. Beyond this maximum, further increases in X lead to decreased lift. The distance between the first surface 18 and the second surface 28 is labeled Y. The distance Y, for example 20 µm, must be greater than the distance X, for example 0.50 µm. The distance Y must also be large enough so that the surface 18 may be neglected for air bearing purposes (such that the viscosity of air cannot create pressure differences over the recess area that are significant compared to the air bearing pressures created on the load-bearing projections 26). The dimensions of each projection depends upon such factors as the desired air bearing gap. However, the ratio of the cumulative surface area of the second surface 28 of the projections 26 to the surface area of the first surface 18 of the slider platform 10 may be between 1 to 5 and 1 to 15.

A preferred construction method is to define the outline of the projections in a hard, wear resistant material, such as sintered aluminum oxide/titanium carbide, using reactive ion etching (RIE) as described in U.S. Pat. No. 4,601,782 to Bianchi et al., hereinafter incorporated by reference. To define the areas that are in contact with the recording surface, ion milling using a photo-lithographic mask may be utilized. The ion milling process parameters such as time determine the recess depth, which is an important parameter that determines the lift, and thus the fly height, of the air bearing.

The air bearing shape of the present invention is best used with lubricants that are bound to the recording surface. Otherwise, the recess areas can gather amounts of lubricant large enough to disturb the aerodynamic lift of the air bearing. The use of special lubricants that are chemically bound to the recording surface is well known in the magnetic storage manufacturing industry. In the present context it is preferable that the lubricant consist solely of bound (not mobile) lubricant. Details of the lubricants used in magnetic storage devices can be found in TRIBOLOGY AND MECHANICS OF MAGNETIC STORAGE DEVICES at 668–74 (B. Bhushan ed. 1990), hereinafter incorporated by reference.

Figure 4:
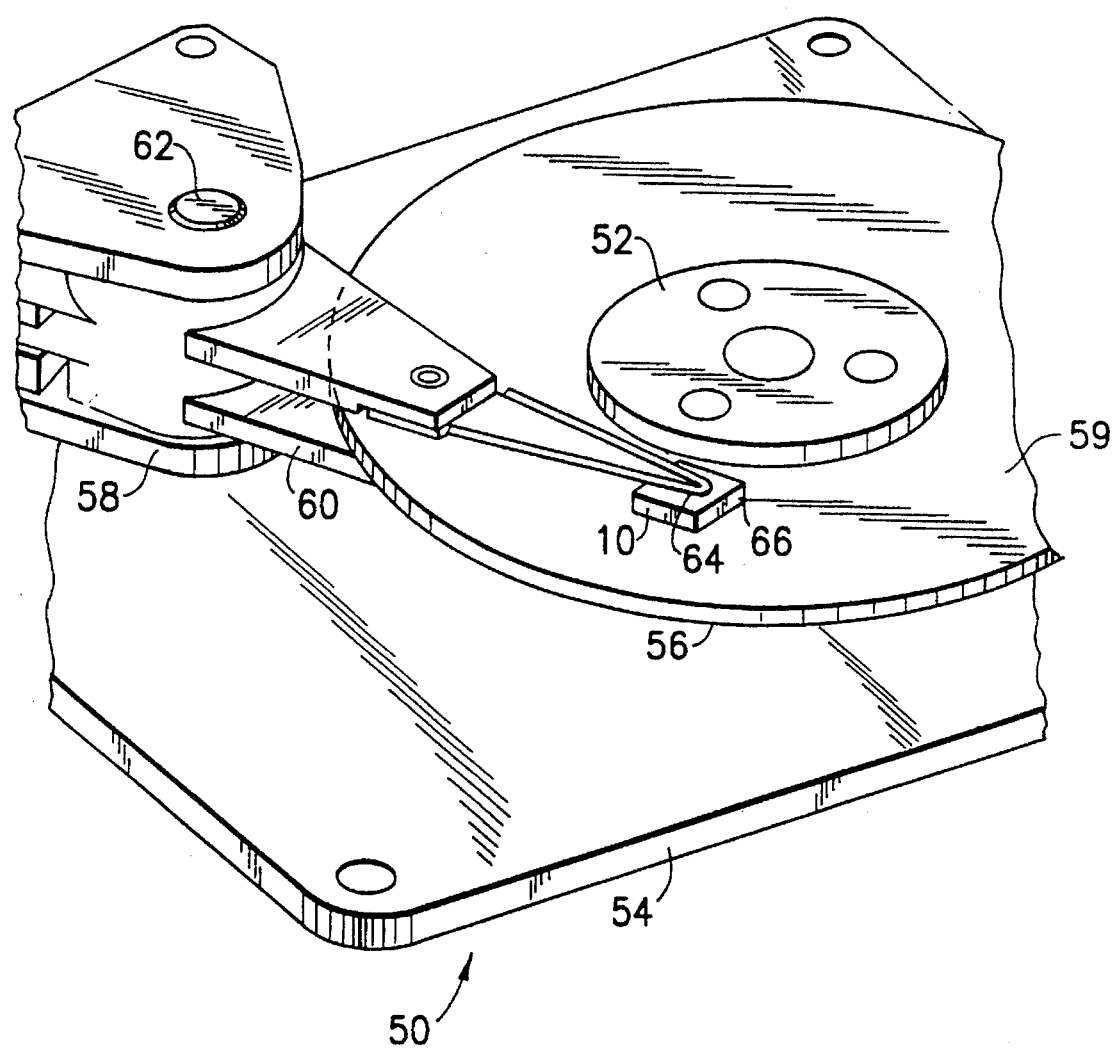
FIG. 4 is a partial top isometric view of a magnetic storage device incorporating the slider of the present invention.

The slider of the present invention may be utilized in a magnetic storage device. With reference to FIG. 4, a magnetic storage device 50 typically includes a spindle 52 attached to a base plate 54. The spindle 52 rotates a magnetic recording disk 56. A rotary actuator 58 also attaches to the base plate 54. A suspension arm 60 extends from the rotary actuator 58 across at least one of a top recording surface 59 and a bottom recording surface (not shown) of the recording disk 56. The suspension arm 60 is moveable across the radius of the recording disk 56 around a pivot 62. Movement of the suspension arm 60 across the radius of the recording disk 56, which corresponds to data bands of the top recording surface 59 and the bottom recording surface, is controlled by the rotary actuator 58. The slider 10 of the present invention is affixed to an end 64 of the suspension arm 60. A read/write head 66 for reading data from and writing data to the top recording surface 59 of the recording disk 56 is integral with the trailing edge 22 of the slider 10. Although not shown, a second slider and read/write head may be similarly affixed to the portion of the suspension arm 60 extending across the bottom surface of the recording disk 56. The slider 10 of FIG. 4 provides an air bearing between the recording surface 59 of the recording disk 56 and the read/write head 66 as illustrated in FIG. 1.

Central to the present invention is the notion that by using projections that are the most efficient lift generators, it is possible to minimize the overall size of the projections. This yields an air bearing design that has significantly smaller actual contact area than that of other air bearing designs. This makes it possible to impart low stiction properties to the slider without having to require this property from the recording surface, for example by texturing the surface. In addition, the small, highly localized load bearing projections make the slider less sensitive to manufacturing defects known as crown, camber and twist.

Although the invention has been shown and described with respect to the particular embodiments thereof, it should be understood by those skilled in the art that the foregoing and various other changes, omissions, and additions in the form and detail thereof may be made without departing from the spirit and scope of the invention.

We claim:

1. A slider for providing an air bearing between a transducer and a moving recording surface, said slider comprising:

a platform having a first surface with a leading edge opposite a trailing edge and a lateral axis between said leading edge and said trailing edge;

a plurality of projections extending from said first surface, each of said projections including a second surface elevated above the first surface and a recess defined by a backwall substantially parallel to said leading edge and side shrouds, wherein said recess provides lift to said slider when said recording surface is moving;

wherein one of said projections is disposed within a first area located only between said leading edge and said lateral axis and another of said projections is disposed within a second area located only between said trailing edge and said lateral axis, and wherein only said second surface of said projections is in apparent contact with said recording surface when said recording surface is stationary.

2. The slider of claim 1, wherein a lubricant is applied to said recording surface, and only said second surface of said projections contacts said lubricant when said recording surface is stationary.

3. The slider of claim 1, wherein said platform comprises a left side opposite a right side, and wherein said slider comprises a first projection disposed adjacent to said leading edge and said left side, a second projection disposed adjacent said leading edge and said right side, and a third projection disposed between said left and right sides and adjacent to said trailing edge.

4. The slider of claim 1, wherein said side shrouds are substantially perpendicular to said back wall.

5. The slider of claims 1, wherein said side shrouds narrow as they extend toward said leading edge.

6. The slider of claim 1, wherein said recess of each of said projections is partially defined by a third surface, and wherein a first distance between said second surface and said third surface of said projections is less than a second distance between said first surface of said platform and said second surface of said projections.

7. The slider of claim 6, wherein said first distance is approximately 0.50 μm and said second distance is approximately 20 μm.

8. The slider of claim 6, wherein said second surface of said projections have a cumulative first surface area, said first surface of said platform has a second surface area, and a ratio of said first surface area to said second surface area is 1 to N, where N is a real number in the range of 5 to 15.

9. The slider of claim 8, wherein N is 15.

10. The slider of claim 8, wherein said first distance is approximately 0.50 μm and said second distance is approximately 20 μm.

11. The slider of claim 1, wherein said second surface of said projections have a cumulative first surface area, said first surface of said platform has a second surface area, and a ratio of said first surface area to said second surface area is 1 to N, where N is a real number in the range of 5 to 15.

12. The slider of claim 11, wherein N is 15.

13. A magnetic storage device comprising:

a rotatable recording disk having a magnetic recording surface; and a transducer affixed to a slider that provides an air bearing between said transducer and said recording surface when said recording surface is rotating;

the slider comprising:

a platform having a first surface with a leading edge opposite a trailing edge and a lateral axis between said leading edge and said trailing edge;

a plurality of projections extending from said first surface, each of said projections including a second surface elevated above the first surface and a recess defined by a backwall substantially parallel to said leading edge and side shrouds, wherein said recess provides lift to said slider when said recording surface is rotating;

wherein one of said projections is disposed within a first area located only between said leading edge and said lateral axis and another of said projections is disposed within a second area located only between said trailing edge and said lateral axis, and wherein only said second surface of said projections is in apparent contact with said recording surface when said recording surface is stationary.

14. The magnetic storage device of claim 13, wherein a lubricant is applied to said recording surface, and only said second surface of said projections contacts with said lubricant when said recording surface is stationary.

15. The magnetic storage device of claim 13, wherein said platform comprises a left side opposite a right side, and wherein said slider comprises a first projection disposed adjacent to said leading edge and said left side, a second projection disposed adjacent said leading edge and said right side, and a third projection disposed between said left and right sides and adjacent to said trailing edge.

16. The magnetic storage device of claim 13, wherein said side shrouds are substantially perpendicular to said back wall.

17. The magnetic storage device of claim 13, wherein said side shrouds narrow as they extend toward said leading edge.

18. The magnetic storage device of claim 13, wherein said recess of each of said projections is partially defined by a third surface, and wherein a first distance between said second surface and said third surface of said projections is less than a second distance between said first surface of said platform and said second surface of said projections.

19. The magnetic storage device of claim 18, wherein said first distance is approximately 0.50 μm and said second distance is approximately 20 μm.

20. The magnetic storage device of claim 18, wherein said second surface of said projections have a cumulative first surface area, said first surface of said platform has a second surface area, and a ratio of said first surface area to said second surface area is 1 to N, where N is a real number in the range of 5 to 15.

21. The magnetic storage device of claim 20, wherein N is 15.

22. The magnetic storage device of claim 20, wherein said first distance is approximately 0.50 μm and said second distance is approximately 20 μm.

23. The magnetic storage device of claim 13, wherein said second surface of said projections have a cumulative first surface area, said first surface of said platform has a second surface area, and a ratio of said first surface area to said second surface area is 1 to N, where N is a real number in the range of 5 to 15.

24. The magnetic storage device of claim 23, wherein N is 15.

* * * * *